Patented July 11, 1950

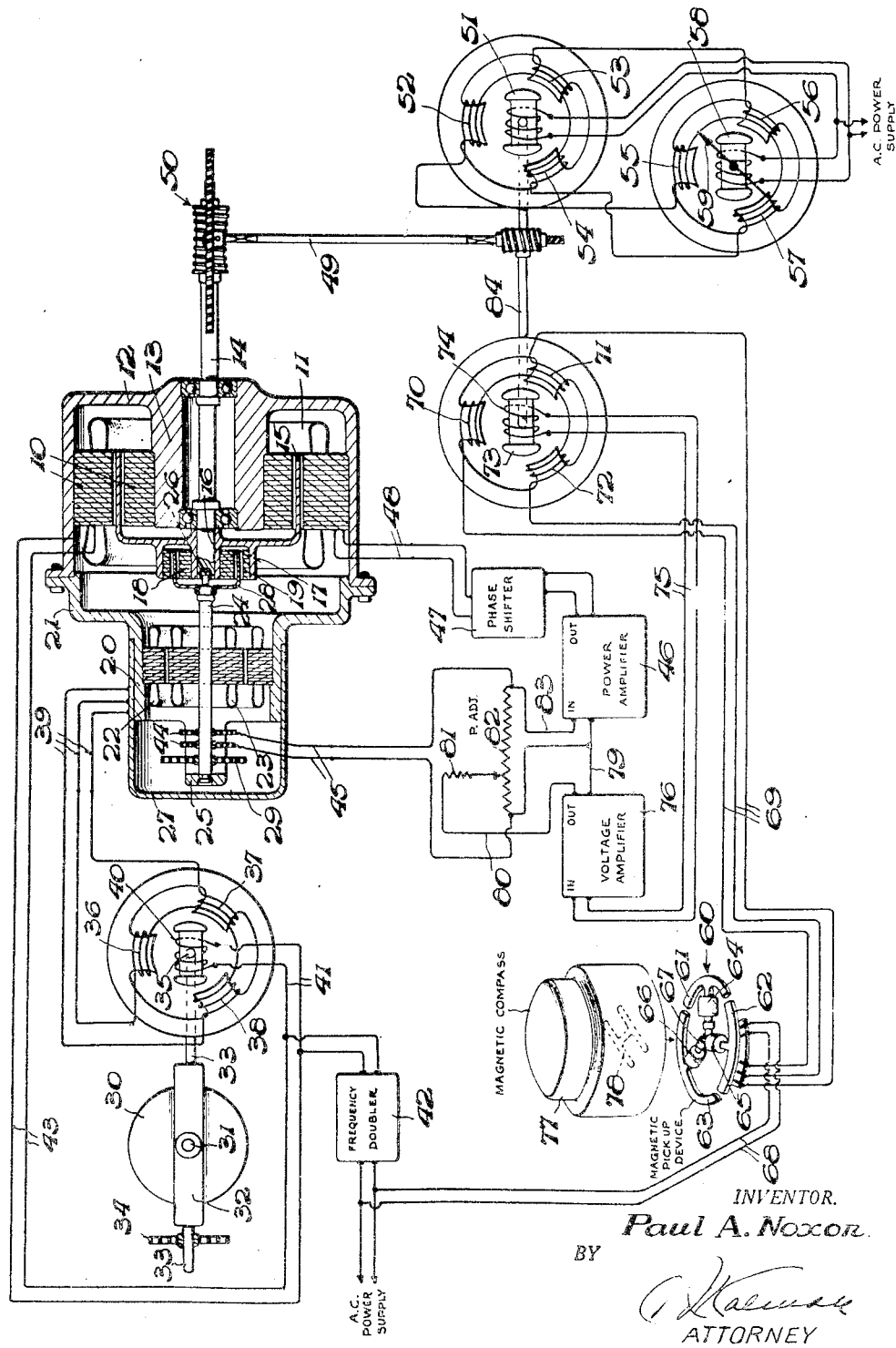

2,514,555

UNITED STATES PATENT OFFICE 2,514,555

ELECTRIC MOTOR CONTROL SYSTEM

Paul A. Noxon, Tenafly, N. J., assignor to Bendix Aviation Corporation, Teterboro, N. J., a corporation of Delaware Original application June 21, 1941, Serial No. 399,241. Divided and this application January 22, 1944, Serial No. 519,389

8 Claims. (Cl. 318—30)

This application is a division of copending application Serial No. 399,241, filed June 21, 1941, now U. S. Patent No. 2,361,790, issued October 31, 1944, and assigned to the assignee of the present invention. The invention disclosed and claimed herein relates to remote control systems wherein a servomotor is utilized to drive a controlled object into positional agreement with a controlling object and more particularly to novel means for overcoming the tendency of the servomotor to override the position of synchronism, or to hunt about that position, once that position has been attained.

An object of the present invention is to improve remote control systems to the extent that a dead beat positional control system is obtained.

Another object of the invention is to provide a novel damping expedient for a servomotor to prevent hunting and over-control on the part of the motor.

A further object is to dampen the operation of a servomotor by generating an electrical signal proportional to the speed of operation of the motor and modifying the operation of the motor in accordance with such signal.

Another and further object of the invention is to provide a novel damping expedient for a two phase induction type of servomotor in the form of an inductive transformer device which is displaced angularly in proportion to the speed of operation of the motor whereby an electrical signal is generated by said inductive device and fed to the variable phase of the motor for modifying the operation thereof so that overcontrol and hunting on the part of the motor is prevented.

A further object of the present invention is to provide a novel method of controlling the operation of a servomotor.

The above and further objects and novel features will more fully appear from the detailed description when the latter is read in connection with the accompanying drawing. It is to be expressly understood, however, that the drawing is for the purpose of illustration only and is not intended as a definition of the limits of the invention.

The single figure of the drawing is a diagrammatic representation, partially in section, of a remote control system embodying a servomotor together with the novel apparatus of the present invention for preventing hunting or overcontrol on the part of the motor.

The single figure of the drawing illustrates the subject matter of the present invention as being tied in with a rate of turn gyro whereby the composite system provides a novel electrical turn integrator more fully described and claimed in the aforementioned copending parent application Serial No. 399,241. Only so much of the system will be considered hereinafter as is pertinent to a better understanding of the present invention, i. e., the anti-hunting control of the servomotor.

Considered from a broad aspect, the present invention comprises a controlled object and a relatively remote controlling object, the latter providing an electrical signal proportional to the magnitude of the condition occurring at the controlling object the value of which it is desired to reproduce at the controlled object. The signal thus generated is amplified and fed to the variable phase of a two phase induction motor whereupon the motor is energized to drive the controlled object into positional or synchronous agreement with the controlling object at which time the motor becomes de-energized. The mechanical connections, gears, etc., do not permit the motor to stop instantly at the position where synchronism between the controlled and the controlling objects has been attained so that there is a tendency to hunt or overcontrol.

To overcome the foregoing disadvantage the shaft of the servomotor is connected through a yieldable coupling with the rotor of an inductive device which is displaced an angular amount proportional to the speed of the motor to thereby generate an electrical signal which is amplified and superimposed upon the controlling signal to thereby oppose the latter signal and dampen the servomotor and prevent its hunting and overcontrol.

Considering now, in greater detail, the novel dampening servo control of the present invention, it is shown, in the drawing, embodied as a part of the electrical turn integrating apparatus of the aforementioned parent application and comprises a two-phase induction motor having stator laminations 10 and two-phase windings 11 mounted within a suitable cup-shaped housing 12 having a central hollow boss portion 13 for supporting a portion of the stator laminations and for accommodating a rotor or driving shaft 14 at the hollow portion thereof, shaft 14 being rotatably mounted therein upon suitable bearings.

The induction motor may be of any suitable and well known type but, in the present instance, is shown as being of the drag-cup type in that shaft 14 has rigidly mounted thereon a drag-cup rotor 15 of non-magnetic material having a sleeve portion 16 surrounding shaft 14 which together with a spaced cylindrical extension 17 of the rotor, defines a chamber for supporting an annular permanent magnet 18 and an annular ring 19 defining a flux return for the magnet, a suitable air gap being defined between magnet 18 and ring 19.

A substantially smaller cylindrical housing 20, is secured to the open end of housing 12 by an extended flange 21 thereof and defines a support for the three phase stator windings 22 of a conventional inductive receiver device having a rotor 23 provided with a single winding thereon inductively coupled with the stator windings. Rotor 23 is mounted for angular motion relative to the stator windings by way of a shaft 24 which is journalled at one end in a bracket 25 and at its other end is provided with a pin 26 which is received within a small recess formed at an extremity of driving shaft 14. The positioning of pin 26 within the recess of shaft 14 in no way acts to transmit directly the angular movement of shaft 14 to shaft 24 but merely acts to maintain shaft 24 in axial alignment with shaft 14. A cover plate 27 is provided for closing the open end of housing 20.

A yieldable connection, in the form of an eddy current drag coupling, is provided between rotor shafts 14 and 24 which comprises a metallic drag-cup 28 supported by shaft 24 and passing into the air gap formed between permanent magnet 18 and return ring 19. At its opposite end, shaft 24 is provided with a suitably calibrated spring 29, one end of which is anchored directly to the shaft and the other end of which is anchored to bracket 25, to define a resilient constraint for opposing rotation of shaft 24.

The rate of turn function from which the above-described apparatus derives the amount of turn is obtained from a rate of turn gyro comprising a gyro rotor 30 mounted for spinning about a horizontal axis 31 which, in turn, is journalled in a gimbal ring 32 having trunnions 33 mounting the gimbal for angular movement about a second horizontal axis perpendicular to the spin axis. One of trunnions 33 is provided with a suitably calibrated spring 34, similar to spring 29, which acts to restrain gyro precession during a craft turn upon which the apparatus is mounted to a rate of turn function. The other of trunnions 33 is mechanically coupled with a rotor 35 of a conventional inductive transmitter device having a stator provided with three phase windings 36, 37 and 38 which are electrically connected by way of leads 39 to the three phase stator windings 22 of the inductive receiver device.

Rotor 35 supports a winding 40 thereon which is energized by way of conductors 41 from a suitable alternating current source (not shown) through a frequency doubler 42 whose purpose will appear hereinafter. The A. C. source for energizing rotor winding 40 is also connected through leads 43 to constantly energize one phase of the two phase induction motor.

The system is normally balanced so that no signal is being generated in receiver rotor 23. As soon, however, as the craft departs from a given course, gyro rotor 30 precesses and its precession is restrained by spring 34 to a rate of turn function. Transmitter rotor 35 is displaced angularly as a result of the turn thereby changing the induced voltages in each of windings 36, 37 and 38, the change being reproduced within stator windings 22 whereupon an angular change in the resultant magnetic field at the stator is produced inducing a signal within the winding of receiver rotor 23. The signal so induced is transmitted through suitable brushes 44 and conductors 45 to the input of a conventional vacuum tube power amplifier 46, the output of which is fed through a suitable phase shifter 47 to energize the second phase of the motor by means of leads 48, the motor upon energization causing rotation of drag-cup rotor 15.

As more fully described in the above-mentioned parent application, the voltage induced in the winding of receiver rotor 23 due to gyro precession is initially utilized to oppose the starting torque of the induction motor. As soon, however, as the speed of the motor increases, sufficient eddy currents are induced in metallic drag cup 28 by virtue of the rotation of rotor 15, whereby rotor 23 is displaced angularly against the action of spring 29 so that its signal, though decreased, is of sufficient value, when amplified within amplifier 46, to maintain the motor speed proportional to the rate of craft turn. If spring 29 were not provided, the motor would drive rotor 23 to a null position at which time the motor would be de-energized. Thus, shaft 24, together with eddy current coupling 18—19—28 and spring 29 define a speed governing device whereby the speed of the induction motor is maintained at a value proportional to the rate of craft turn when the craft has developed a velocity upon departure from a prescribed course.

The motor may be arranged to drive a relatively remote indicator or, in the case of an automatic pilot, a desired control surface whereby the indicator or surface will be driven an amount proportional to the amount of craft departure from a prescribed course. In the present instance, the induction motor is shown as driving a shaft 49, through a gear reduction system 50, the shaft being geared to angularly displace a rotor 51 of an inductive transmitter having three phase stator windings 52, 53 and 54 which are connected through suitable conductors with the three phase stator windings 55, 56 and 57 of an inductive receiver having a rotor 58 mounting a pointer 59, rotors 51 and 58 being electrically interconnected with each other and with a suitable A. C. source.

Because errors of integration arise with the use of such integrating devices, a corrective system is provided to overcome such errors and comprises a magnetic pick-up device 60 having three legs 61, 62 and 63 which join at a common central point and each of which is provided with output coils 64, 65 and 66. The junction point of legs 61, 62 and 63 is provided with an energizing winding 67 which connects by way of conductors 68 with the A. C. source from which the one phase of the induction motor is constantly energized. The pick-up device 60 may be of the type shown and disclosed in copending application Serial No. 464,095, filed October 31, 1942, now U. S. Patent No. 2,361,433, issued October 31, 1944, which is assigned to the assignee of the present invention.

As fully described in the above-mentioned application, the earth's magnetic field threads legs 61, 62 and 63, the density of the flux threading each leg being dependent upon the angular disposition of each leg with respect to the earth's magnetic field. The energizing winding 67 in being supplied with an alternating current from the source, alternately saturates and desaturates each of the three legs of the pick-up device so that the earth's field is driven from out of the legs, thus inducing an impulse in each of windings or coils 64, 65 and 66. Since at each half-cycle of the energizing current, two impulses are induced through the coils, one impulse being produced at substantially the point of saturation and the other at the point where desaturation sets in, the frequency of the final output of each of windings 64, 65 and 66 will be twice the frequency of the energizing current. Since this output voltage is utilized, in a manner to be presently described, to energize the second phase of the induction motor, the frequency of the voltage energizing the first phase of the motor must be the same as the frequency of the voltage energizing the second phase, and for that reason frequency doubler 42 is provided between the A. C. source and the constant phase of the motor.

Since the voltages induced in coils 64, 65 and 66 of the pick-up device are of a relatively small value, it is desirable that they be amplified and, therefore, they are connected by way of leads 69 to stator windings 70, 71 and 72 of a relatively remote inductive receiver device having an angularly movable rotor 73 inductively associated with the stator windings, the rotor being provided with a coil 74 connected by way of leads 75 to the input of a suitable conventional voltage amplifier 76.

The earth's magnetic field may be used to directly thread the legs 61, 62 and 63 or if it is desired, the pick-up device may be arranged adjacent a magnetic compass 77 having well known compass magnets 78 which, by virtue of the action of the earth's magnetic field, line up with or are parallel to the lines of force of the earth's field and, at the same time, define a permeable path for concentrating the lines of force of the earth's field. Both the magnetic compass 77 and the pick-up device 60 are stationary with respect to the craft and, therefore, during a deviation of the craft from a prescribed course relative movement ensues between the compass magnets 78 and the pick-up device. This angular displacement varies the density of the flux traversing each of the legs 61, 62 and 63 of the pick-up device and, therefore, varies the amount of voltage induced in each coil 64, 65 and 66, this change being communicated to stator windings 70, 71 and 72 of the coupling device whereby the angular change of the resultant magnetic field of the windings induces a voltage in rotor coil 74 which voltage is communicated to voltage amplifier 76.

The output of voltage amplifier 76 is fed to the input of power amplifier 46 by way of leads 79 and 80, the latter being connected with an adjustable sliding element 81 cooperating with a resistor 82 and lead 83. This arrangement of element 81 may be termed a proportionality adjustment, the purpose of which is to initially set the complete apparatus in such a manner that the output of voltage amplifier 76 resulting from the pick-up device will be substantially below the value of the voltage communicated to power amplifier 46 from the winding of rotor 23.

The output of voltage amplifier 76 is thus fed into power amplifier 46 and out therefrom to energize the second phase of the induction motor and cause the latter to operate whereby shaft 14 thereof drives shaft 49, the latter being geared to a shaft 84 which carries rotor coil 74 as well as rotor 51. The motor operates until rotor coil 74 is driven to a null wherein its signal drops to zero and the motor becomes de-energized. At the same time, pointer 59 is displaced angularly to indicate the amount of craft departure from its prescribed course.

During normal linear craft flight, the integrator is at rest and the compass system has primary control over the angular motion of pointer 59. Any minor deviation of the craft from a predetermined course, which is insufficient to cause precession of the rate gyro, is communicated to pointer 59 from the compass system. This is accomplished by reason of the changed voltages in windings 64, 65 and 66 of the pick-up device resulting from minor angular displacement of the pick-up device relative to compass magnets 78 which change is reproduced at stator windings 70, 71 and 72 and causes a signal to be induced in rotor coil 74, the signal being amplified in amplifier 76 and power amplifier 46 to energize the second phase of the induction motor to thereby drive shafts 14 and 49 to drive rotor coil 74 to a new null and pointer 59 to indicate the amount of craft deviation.

It is of importance to note that as the induction motor is operated in response to changed voltages at the output of the pick-up device, receiver rotor 23 of the receiver inductive device will be moved a minor angular amount from its null to have a voltage induced therein which is fed into power amplifier 46 and which is opposite to the direction signal emanating at the pick-up device.

Although the turn gyro is showing no turn, the transmitter rotor 35, in being energized from the A. C. source, produces at all times voltages in each of stator windings 36, 37 and 38 which provide a similar set of voltages in the windings 22 of the receiver stator. The voltage component induced in rotor 23 due to its angular displacement from null by the induction motor opposes the action of the direction signal upon the second phase of the motor to oppose or dampen the speed of operation of the motor to overcome hunting or overcontrol on the part of the motor.

For a better understanding of the present invention, it may be considered that rate gyro 30 has been dispensed with and that the inductive transmitter and receiver devices thereof are normally in synchronism so that no signal is present in rotor 23. Moreover, element 81 has been properly adjusted so that any signal generated within rotor 23 will no longer be greater than the signal in rotor coil 74 resulting from the pick-up device.

In such an event, the second phase of the induction motor will be energized, as before, from the magnetic pick-up device in response to a deviation of the craft from a prescribed course and will drive rotor coil 74 to a null through shafts 14 and 49. If receiver rotor 23 were not provided, the energizing signal from the rotor coil 74 would drop to zero once coil 74 reached its null but due to mechanical inertia, etc., the motor would continue operating whereupon rotor coil 74 would be driven past its new null position to generate a reverse signal to cause hunting on the part of the motor.

Such hunting, however, in the present instance, is prevented by the presence of rotor 23. As soon as the induction motor is energized from the pick-up device, it angularly displaces, through the eddy current coupling, rotor 23 from its null relative to stator windings 22 whereupon a signal proportional to the speed of operation of the induction motor is induced in rotor 23 opposite to the direction signal of the pick-up device, such signal being fed through power amplifier 46 to the second phase of the induction motor. As a result of this feed-back signal an anticipatory control is derived in that a false null is attained by the motor before rotor coil 74 reaches its true null, the feed-back signal being opposite to but comparable to the direction signal when such false null is developed. Thereafter, the mechanical inertia of the motor causes it to operate to the correct null and as that point is reached the signal of rotor 23 acts as a brake on the motor to stop it at the correct null whereby dead beat control is obtained.

The advantages derived with the foregoing dampening arrangement are numerous. For example, where the servo system described herein is applied to the rudder control of an automatic pilot for air or other dirigible craft, hunting and overcontrol of the rudder is prevented and in its stead dead beat positional control is obtained. Although the servo dampening system has been described and illustrated in connection with a remote control system for aircraft it is apparent that it can be applied as well to any system using a servomotor where it is desired to prevent its hunting or overcontrol.

Although but a single embodiment of the invention has been illustrated and described in detail, it is to be expressly understood that the invention is not limited thereto. Various changes may be made in the design and arrangement of the parts without departing from the spirit and scope of the invention, as will now be apparent to those skilled in the art. For a definition of the limits of the invention, reference is to be had primarily to the appended claims.

I claim:

1. In a positional control system, a controlling object, a controlled object, a polyphase motor for driving said controlled object and having one of its phases constantly energized from a current source, means actuated by said controlling object for generating an electrical signal proportional to the positional disagreement of said controlling and controlled objects for energizing a second phase of said motor whereby said controlled object is driven into positional agreement with said controlling object, means driven by said motor for generating a second signal proportional to the speed of said motor, said driven means including an eddy current drag coupling, and means for impressing said second signal upon said second phase of said motor to modify the operation of said motor.

2. In a positional control system, a controlling object, a controlled object, a two phase induction motor for driving said controlled object and having one phase thereof constantly energized from a current source, means actuated by said controlling object for generating an electrical signal proportional to the positional disagreement of said controlling and controlled objects, means for amplifying said signal to energize the second phase of said motor whereby said controlled object is driven into positional agreement with said controlling object, means driven by said motor for generating a second electrical signal proportional to the speed of operation of said motor, said driven means including a rotor of an inductive device having yieldable connection with said motor, and means transmitting said second signal to said amplifying means to be there amplified and superimposed upon said first signal energizing said second phase of said motor to modify the operation of said motor.

3. In combination, a two phase induction motor having one phase thereof constantly energized from a current source and the second phase thereof energized in response to a variable reference signal, inductive means comprising a stator and an angularly movable rotor inductively associated with the stator, an eddy current drag coupling connecting said motor for moving said rotor whereby a second electrical signal is generated in said inductive means proportional to the speed of operation of said motor, and means for impressing said second signal upon the reference signal in the second phase of said motor.

4. In a positional control system, a controlling object, a controlled object, a motor for driving said controlled object, means actuated by said controlling object for generating an electrical signal proportional to the disagreement of said controlling and controlled objects for energizing said motor whereby said controlled object is driven into positional agreement with said controlling object, means comprising an inductive device having an angularly displaceable part, a spring having one end fixed and its other end attached to said rotatable part for providing a resilient constraint for opposing rotation of said rotatable part, and means comprising a drag coupling connecting said motor and said rotatable part for angularly displacing said rotatable part whereby a signal is generated in said rotatable part proportional to the movement of said motor for modifying the operation thereof.

5. In a positional control system, a controlling object, a controlled object, a motor for driving said controlled object, means actuated by said controlling object for controlling said motor, said means comprising an inductive device having a rotor and a stator for generating an electrical signal proportional to the disagreement of said controlling and controlled objects for energizing said motor whereby said controlled object is driven into positional agreement with said controlling object, electrical means comprising a stator and an angularly movable rotor inductively associated with said stator, means connecting said motor with said last-named rotor for moving said rotor relative to said stator whereby a signal is generated in said rotor proportional to the speed of said motor for modifying the operation thereof, said connecting means comprising an eddy current drag coupling, and means for resiliently restraining rotation of said rotor.

6. In a positional control system, a controlling object, a controlled object, a polyphase motor for driving said controlled object and having one of its phases constantly energized from a current source, means actuated by said controlling object for generating an electrical signal proportional to the positional disagreement of said controlling and controlled objects for energizing a second phase of said motor whereby said controlled object is driven into positional agreement with said controlling object, electrical means comprising a stator and an angularly movable rotor inductively associated with the stator, speed governing means for said rotor, said speed governing means comprising an eddy current drag coupling between said motor and said rotor for moving said rotor relative to said stator, and a spring for yieldingly restraining rotation of said rotor, whereby a signal is generated in said rotor for modifying the operation of said motor to prevent hunting and over-control thereof.

7. In a positional control system, a controlling object, a controlled object, a polyphase motor for driving said controlled object and having one of its phases constantly energized from a current source, means actuated by said controlling object for generating an electrical signal proportional to the disagreement of said controlling and controlled objects for energizing a second phase of said motor whereby said controlled object is driven into positional agreement with said controlling object, an inductive device having a rotor and a stator for generating a second signal proportional to the speed of said motor, means comprising an eddy current coupling for driving said rotor from said motor, means for yieldingly restraining rotation of said rotor, and means for impressing said second signal upon said second phase of said motor to modify the operation of said motor.

8. In a positional control system, a rate of turn gyro comprising a gyro rotor mounted for spinning about a horizontal axis, a controlled object, a polyphase motor for driving said controlled object and having one of its phases constantly energized from a current source, an inductive device having a stator and a rotor actuated by said gyro in response to precessional movement of said gyro for generating an electrical signal for energizing a second phase of said motor, a second inductive device for generating a second signal proportional to the speed of said motor, said second inductive device having a rotor connected by an eddy current drag coupling to said motor, resilient means for yieldingly restraining the rotation of said rotor of said second inductive device, and means for impressing said second signal upon said second phase of said motor whereby the speed of said motor is maintained at a value proportional to the rate of precessional movement of said gyro when said gyro has been caused to precess.

PAUL A. NOXON.

REFERENCES CITED

The following references are of record in the file of this patent:

UNITED STATES PATENTS

| Number | Name | Date |
|---|---|---|
| 2,105,598 | Hubbard | Jan. 18, 1938 |
| 2,115,086 | Riggs | Apr. 26, 1938 |
| 2,172,410 | Riggs | Sept. 12, 1939 |
| 2,245,034 | Harrison | June 10, 1941 |
| 2,357,319 | Esval et al. | Sept. 5, 1944 |
| 2,361,433 | Stuart | Oct. 31, 1944 |
| 2,361,790 | Noxon | Oct. 31, 1944 |

FOREIGN PATENTS

| Number | Country | Date |
|---|---|---|
| 489,271 | Great Britain | July 22, 1928 |